(12) United States Patent
Packer

(10) Patent No.: US 7,016,999 B1
(45) Date of Patent: Mar. 21, 2006

(54) HARDWARE CIRCUIT AND METHOD FOR AUTOMATICALLY CONFIGURING ON-THE-FLY A SUB-UNIT IN A SCSI MESSAGE

(75) Inventor: John S. Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 503 days.

(21) Appl. No.: 10/068,650

(22) Filed: Feb. 5, 2002

(51) Int. Cl.
*G06F 13/00* (2006.01)
*G06F 3/00* (2006.01)
*G06F 13/12* (2006.01)

(52) U.S. Cl. ............................. 710/300; 710/2; 710/65
(58) Field of Classification Search .................... 710/2, 710/305–317, 65, 300
See application file for complete search history.

(56) References Cited

U.S. PATENT DOCUMENTS

| | | | | |
|---|---|---|---|---|
| 5,167,029 A | * | 11/1992 | Eikill et al. .................... | 710/65 |
| 5,185,859 A | * | 2/1993 | Guttag et al. ................ | 345/563 |
| 5,961,616 A | * | 10/1999 | Wakasugi et al. ............. | 710/65 |
| 6,370,601 B1 | * | 4/2002 | Baxter .......................... | 710/65 |
| 6,577,629 B1 | * | 6/2003 | Kraemer ...................... | 370/392 |
| 6,804,739 B1 | * | 10/2004 | Young et al. ................ | 710/300 |
| 2002/0067829 A1 | * | 6/2002 | Ficco ............................ | 380/210 |
| 2002/0103943 A1 | * | 8/2002 | Lo et al. ......................... | 710/2 |

OTHER PUBLICATIONS

PCI-toPCI Bridge Architecture Specification, Revision 1.1, Dec. 18, 1998, pp. 19-24.*

* cited by examiner

*Primary Examiner*—Tim Vo
*Assistant Examiner*—Nimesh Patel
(74) *Attorney, Agent, or Firm*—Gunnison, McKay & Hodgson, L.L.P.; Forrest Gunnison

(57) ABSTRACT

A SCSI message manipulation circuit in a SCSI expander detects a specified SCSI message from either a SCSI initiator, or a SCSI target. After detecting the specified SCSI message, the SCSI message manipulation circuit detects a pre-selected message-unit, e.g., a specific byte, within the message. Upon detecting the pre-selected message unit, the SCSI message manipulation circuit sets a pre-selected sub-unit, e.g., a bit, within the pre-selected message-unit to a state, which is programmable, as the SCSI message passes through the SCSI expander.

32 Claims, 13 Drawing Sheets

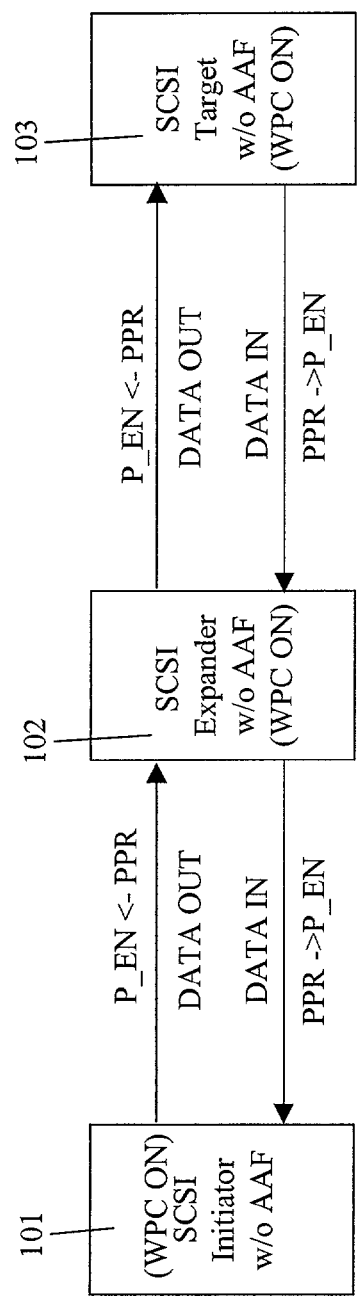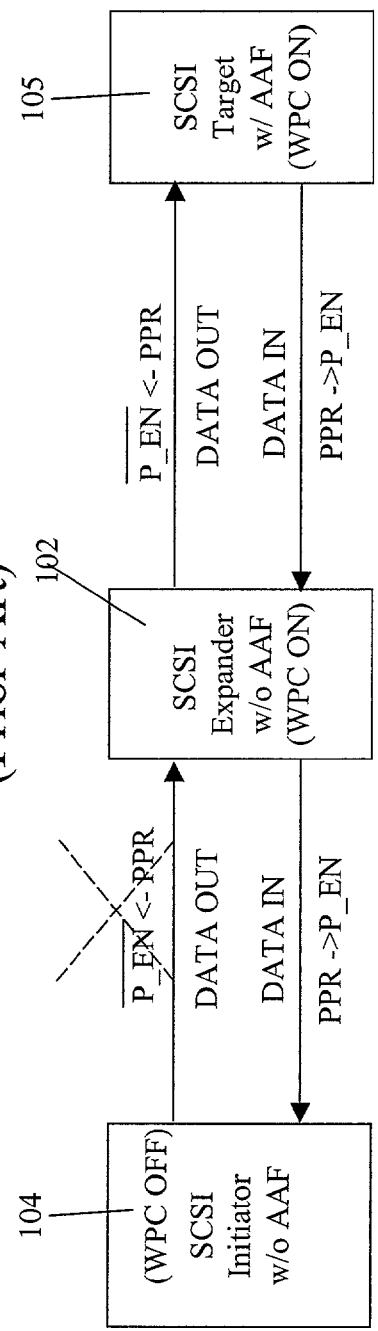

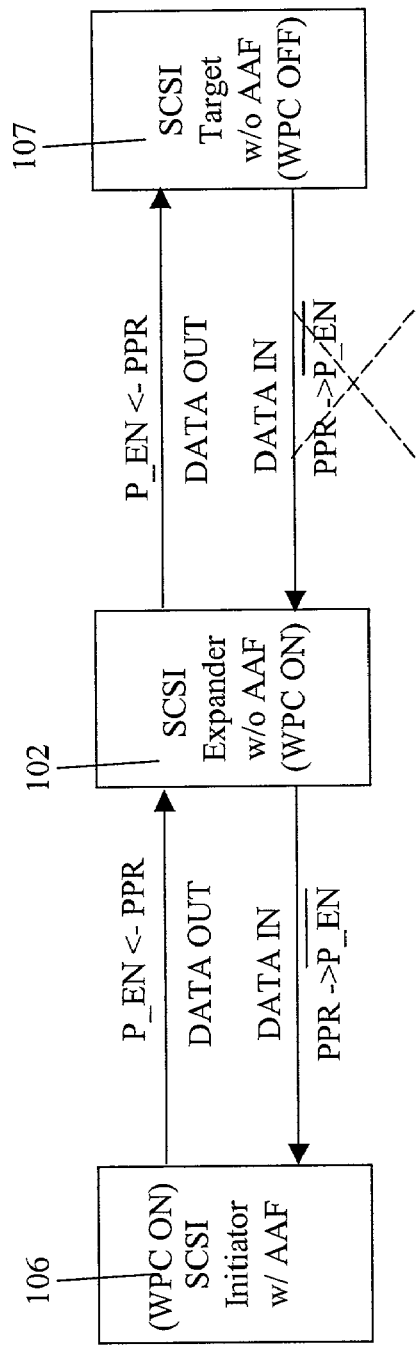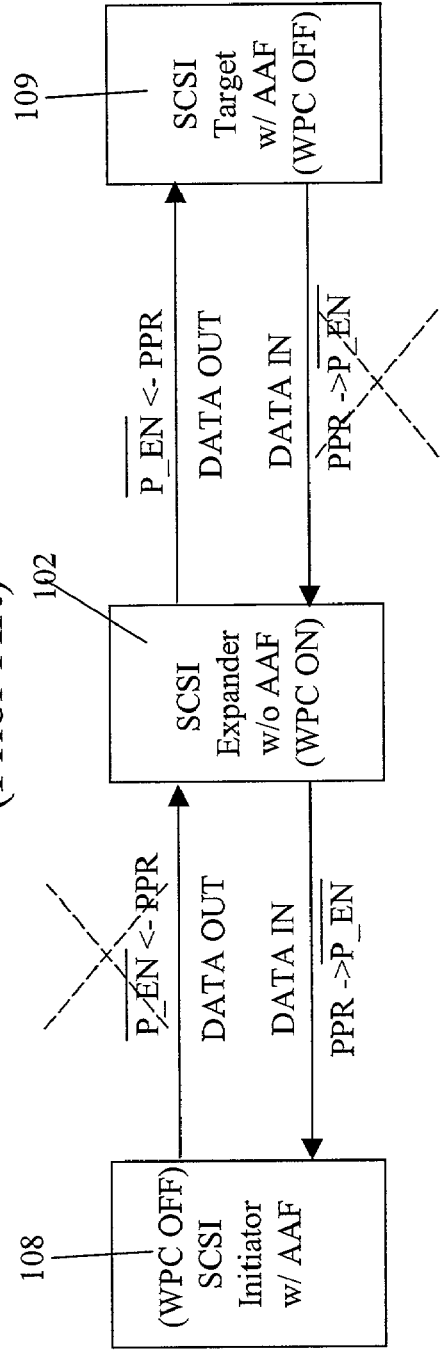
Fig. 1C (Prior Art)
Fig. 1D (Prior Art)

HARDWARE CIRCUIT AND METHOD FOR AUTOMATICALLY CONFIGURING ON-THE-FLY A SUB-UNIT IN A SCSI MESSAGE

BACKGROUND OF THE INVENTION

1. Field of the Invention

The present invention relates generally to SCSI expander devices, and more particularly to using a SCSI expander with a variety of SCSI target and SCSI initiator devices having different signal conditioning requirements.

2. Description of Related Art

In a system that utilizes the Packetized SCSI Protocol, there are two methods used for signal conditioning. A first signal conditioning method, called write precompensation (WPC), conditions the driving signal. A second signal conditioning method, called adjustable active filtering (AAF), conditions the received signal. Unfortunately, the two signal conditioning methods are incompatible because an AAF input signal is overdriven if WPC is used. According to the SCSI specification, WPC signal conditioning is mandatory while AAF signal conditioning is optional.

For the Packetized SCSI Protocol, a SCSI initiator and a SCSI target use a Parallel Protocol Request (PPR) message in negotiating parameters for a data transfer between the SCSI initiator and the SCSI target over a SCSI bus. Execution of the Parallel Protocol Request message is done in two passes. The SCSI initiator sends a PPR message to the SCSI target with required and/or requested transfer parameters. In response to this PPR message, the SCSI target returns a PPR message with its requirements and/or requests. Both the SCSI initiator and the SCSI target agree on the least common denominator of parameters for the ensuing data transfers.

A precompensation enable control bit P_EN is used in the PPR message to select whether write precompensation is turned on or turned off. The device that sends the PPR message asserts precompensation enable control bit P_EN if the device wants the other device to turn on write precompensation for its drivers. Conversely, the device that sends the PPR message negates precompensation enable control bit P_EN if the device implements adjustable active filtering, and wants write precompensation turned off.

This technique for activating write precompensation depending on support for adjustable active filtering presents problems when using a SCSI expander that does not support adjustable active filtering because the method selected does not reflect the limitations of the SCSI expander. FIGS. 1A to 1D illustrate four possible SCSI initiator and SCSI target configurations using write precompensation and adjustable active filtering with a SCSI expander 102 that does not support adjustable active filtering.

In FIG. 1A, neither SCSI initiator 101 nor SCSI target 103 supports adjustable active filtering. For a SCSI bus phase DATA OUT, SCSI target 103 sets precompensation enable control bit P_EN in the PPR message that is passed by SCSI expander 102 to SCSI initiator 101. When SCSI initiator 101 sends data to SCSI target 103 through SCSI expander 102 that does not support adjustable active filtering, the message correctly indicates that expander 102 requires write precompensation.

For a SCSI bus phase DATA IN, SCSI initiator 101 sets precompensation enable control bit P_EN in the PPR message that is passed by SCSI expander 102 to SCSI target 101. When SCSI target 103 sends data to SCSI target 103 through SCSI expander 102 that does not support adjustable active filtering, the data transfer is successful because expander 102 required write precompensation. However, the system configuration of FIG. 1A is the only one that works successfully with SCSI expander 102.

In FIG. 1B, SCSI target 105 supports adjustable active filtering and SCSI initiator 104 does not support adjustable active filtering. For a SCSI bus phase DATA OUT, SCSI target 105 negates precompensation enable control bit P_EN in the PPR message that is passed by SCSI expander 102 to SCSI initiator 101. This message erroneously indicates to SCSI initiator 101 that SCSI expander 102 supports adjustable active filtering, which is incorrect.

In FIG. 1C, SCSI initiator 106 supports adjustable active filtering, and SCSI target 107 does not support adjustable active filtering. For a SCSI bus phase DATA IN, SCSI initiator 105 negates precompensation enable control bit P_EN in the PPR message that is passed by SCSI expander 102 to SCSI target 107. This message also erroneously indicates to SCSI target 107 that SCSI expander 102 does not require write precompensation.

In FIG. 1D, SCSI initiator 108 supports adjustable active filtering and SCSI target 109 also supports adjustable active filtering. For a SCSI bus phase DATA IN, SCSI initiator 108 negates precompensation enable control bit P_EN in the PPR message that is passed by SCSI expander 102 to SCSI target 109. This message erroneously indicates to SCSI target 109 that SCSI expander 102 does not require write precompensation. For a SCSI bus phase DATA out, SCSI target 109 negates precompensation enable control bit P_EN in the PPR message that is passed by SCSI expander 102 to SCSI initiator 108. This message erroneously indicates to SCSI initiator 108 that SCSI expander 102 does not require write precompensation.

Since the state of the precompensation enable control bit in the PPR message considers only the initiator and target, a SCSI expander is limited to working with initiator and targets that have the same signal conditioning as the SCSI expander. Consequently, a SCSI expander with a given signal conditioning is useful only in limited system configurations.

SUMMARY OF THE INVENTION

According to one embodiment of the present invention, a device includes a first I/O bus-interface circuit, and an on-the-fly message manipulation circuit connected to the first I/O bus-interface circuit. The on-the-fly message manipulation circuit sets on-the-fly a pre-selected sub-unit of a pre-selected message-unit of a message to a pre-selected state as the pre-selected message-unit is passed through the device.

The on-the-fly manipulation circuit also includes a message detector module having an input coupled to the first I/O bus-interface circuit, and a message-detected line. In response to information indicative of the message on the input, the message detector module generates an active signal on the message-detected line.

The on-the-fly message manipulation circuit further includes a message-unit detector module having a message-unit detected line. The message-unit detector module generates an active signal on the message-unit detected line upon detecting the pre-selected message-unit of the message.

In addition, the on-the-fly message manipulation circuit further includes a message sub-unit state selection module coupled to the message-detected line and to the message-unit detected line. The message sub-unit state selection module sets the pre-selected sub-unit of the pre-selected message-unit of the message to the pre-selected state after receiving the active signal on the message-detected line, and the active signal on the message-unit detected line.

In yet another embodiment, a SCSI expander includes a first SCSI bus-interface circuit, a second SCSI bus-interface circuit, and a SCSI message manipulation circuit connected to the first and second SCSI bus-interface circuits. The SCSI message manipulation circuit is one embodiment of an on-the-fly message manipulation circuit. The SCSI message manipulation circuit sets a pre-selected sub-unit of a pre-selected message-unit of a SCSI message to a pre-selected state as the pre-selected message-unit is passed through the SCSI expander, i.e., on-the-fly. Hence, this SCSI expander can be used in a system that includes SCSI devices using any desired type of signal conditioning for example.

The SCSI manipulation circuit also includes a message detector module. The message detector module includes an input coupled to the first and second SCSI bus-interface circuits, and a message-detected line. In response to information indicative of the SCSI message on the input, the message detector module generates an active signal on the message-detected line.

The SCSI message manipulation circuit further includes a message-unit detector module having a message-unit detected line. The message-unit detector module generates an active signal on the message-unit detected line upon detecting the pre-selected message-unit of the SCSI message.

The SCSI message manipulation circuit includes a message sub-unit state selection module coupled to the message-detected line and to the message-unit detected line. In one embodiment, the message sub-unit state selection module sets the pre-selected sub-unit of the pre-selected message-unit of the SCSI message to the pre-selected state after the signal on the message-detected line goes active, and the active signal on the message-unit detected line is received.

In another embodiment, the message sub-unit state selection module further includes an enable line. The message sub-unit state selection module sets the pre-selected sub-unit of the pre-selected message-unit of the SCSI message to the pre-selected state only when an active signal is on the enable line.

In one embodiment, the SCSI message is a SCSI Parallel Protocol Request Message (PPR message). One embodiment of the SCSI expander of this invention does not support adjustable active filtering signal conditioning. In another embodiment, the SCSI expander of this invention supports adjustable active filtering signal conditioning. In the embodiment for the SCSI PPR message, the pre-selected message-unit has a size of one byte and the pre-selected sub-unit is a precompensation enable control bit in that byte.

Herein, adjustable active filtering and adjustable active filtering signal conditioning are the same thing. Similarly, herein, write precompensation and write precompensation signal conditioning are the same thing.

In yet another embodiment of the present invention, a device includes a message manipulation circuit that in turn includes a message-detected line, a message-unit detected line, and a message sub-unit state selection module connected to the message-detected line and to the message-unit detected line. The message sub-unit state selection module sets a pre-selected sub-unit of a pre-selected message-unit of a message to a pre-selected state after receiving an active signal on the message-detected line, and an active signal on the message-unit detected line.

In still another embodiment of the present invention, a SCSI expander includes a SCSI message manipulation circuit that in turn includes (a) a message detector module including a message decoder coupled to receive information indicative of a SCSI message from a SCSI bus, and a message-detected line connected to the message decoder where the message decoder generates an active signal on the message-detected line upon decoding the information indicative of the SCSI message; (b) a message-unit detector module including a counter wherein the counter counts message-units in the SCSI message, a message-unit selection register, a comparator connected to the counter and to the message-unit selection register, and a message-unit detected line connected to the comparator, where the comparator generates an active signal on the message-unit detected line upon receiving a value from the counter that has a pre-selected relationship to a value stored in the message-unit selection register to indicate that a pre-selected message unit has been detected, and (c) a message sub-unit state selection module connected to the message-detected line and to the message-unit detected line where the message sub-unit state selection module sets a pre-selected sub-unit of the pre-selected message-unit of the SCSI message to a pre-selected state upon receiving the active signal on the message-detected line, and the active signal on the message-unit detected line, as the pre-selected message-unit passes through the SCSI expander.

The message sub-unit state selection module has an output bus having a plurality of output lines and a first plurality of logic gates. An output terminal of each logic gate of the first plurality of logic gates is selectively coupled to and selectively decoupled from a different output line of the output bus. An input bus has a plurality of input lines where each line in the plurality of input lines is connected to a first input terminal of a different logic gate in the first plurality of logic gates.

The message sub-unit state selection module also has a second plurality of logic gates. An output terminal of each logic gate of the second plurality of logic gates is connected to a second input terminal of the different logic gate in the first plurality of logic gates. The message-detected line is connected to a first input terminal of each logic gate of the second plurality of logic gates. The message-unit detected line is connected to a second input terminal of each logic gate of the second plurality of logic gates.

The message sub-unit state selection module further includes an encoder having an enable sub-unit output bus-including a plurality of lines. Each line in the enable sub-unit output bus is connected to a third input terminal of a different logic gate in the second plurality of logic gates. A sub-unit selection register is connected to the encoder.

A method for configuring a pre-selected sub-unit of a message on-the-fly includes:

detecting the message using a hardware circuit in a device;

detecting a pre-selected message-unit of the message using the hardware circuit; and configuring the pre-selected sub-unit of the pre-selected message-unit of the message to a pre-selected state using the hardware circuit as the pre-selected message-unit is passed through the device.

While a pre-selected sub-unit in a pre-selected unit is manipulated on-the-fly, in one embodiment, in another embodiment, multiple pre-selected sub-units in the pre-selected unit are manipulated on-the-fly. In still another embodiment, pre-selected sub-units in multiple pre-selected units are manipulated on-the-fly. In still another embodiment, any or all of these actions are performed on-the-fly on multiple messages. Hence, the use of a specific message, a specific pre-selected unit in that message, and a pre-selected sub-unit in that unit is illustrative only and is not intended to limit the invention to this specific embodiment.

BRIEF DESCRIPTION OF THE DRAWINGS

FIG. 1A is an illustration of a prior art system that includes a SCSI initiator that does not support AAF signal conditioning, a SCSI expander that does not support AAF signal conditioning, and a SCSI target that does not support AAF signal conditioning.

FIG. 1B is an illustration of a prior art system that includes a SCSI initiator that does not support AAF signal conditioning, a SCSI expander that does not support AAF signal conditioning, and a SCSI target that supports AAF signal conditioning that results in an incorrect configuration in the SCSI phase DATA OUT.

FIG. 1C is an illustration of a prior art system that includes a SCSI initiator that supports AAF signal conditioning, a SCSI expander that does not support AAF signal conditioning, and a SCSI target that does not support AAF signal conditioning that results in an incorrect configuration in the SCSI phase DATA IN.

FIG. 1D is an illustration of a prior art system that includes a SCSI initiator that supports AAF signal conditioning, a SCSI expander that does not support AAF signal conditioning, and a SCSI target that supports AAF signal conditioning that results in an incorrect configuration in the SCSI phases DATA OUT and DATA IN.

In the drawings and the following detailed description, elements with the same reference numeral are the same or similar elements. Also, the first digit of a reference numeral for an element is the number of the figure in which that element first appears.

DETAILED DESCRIPTION

Figure 2A:
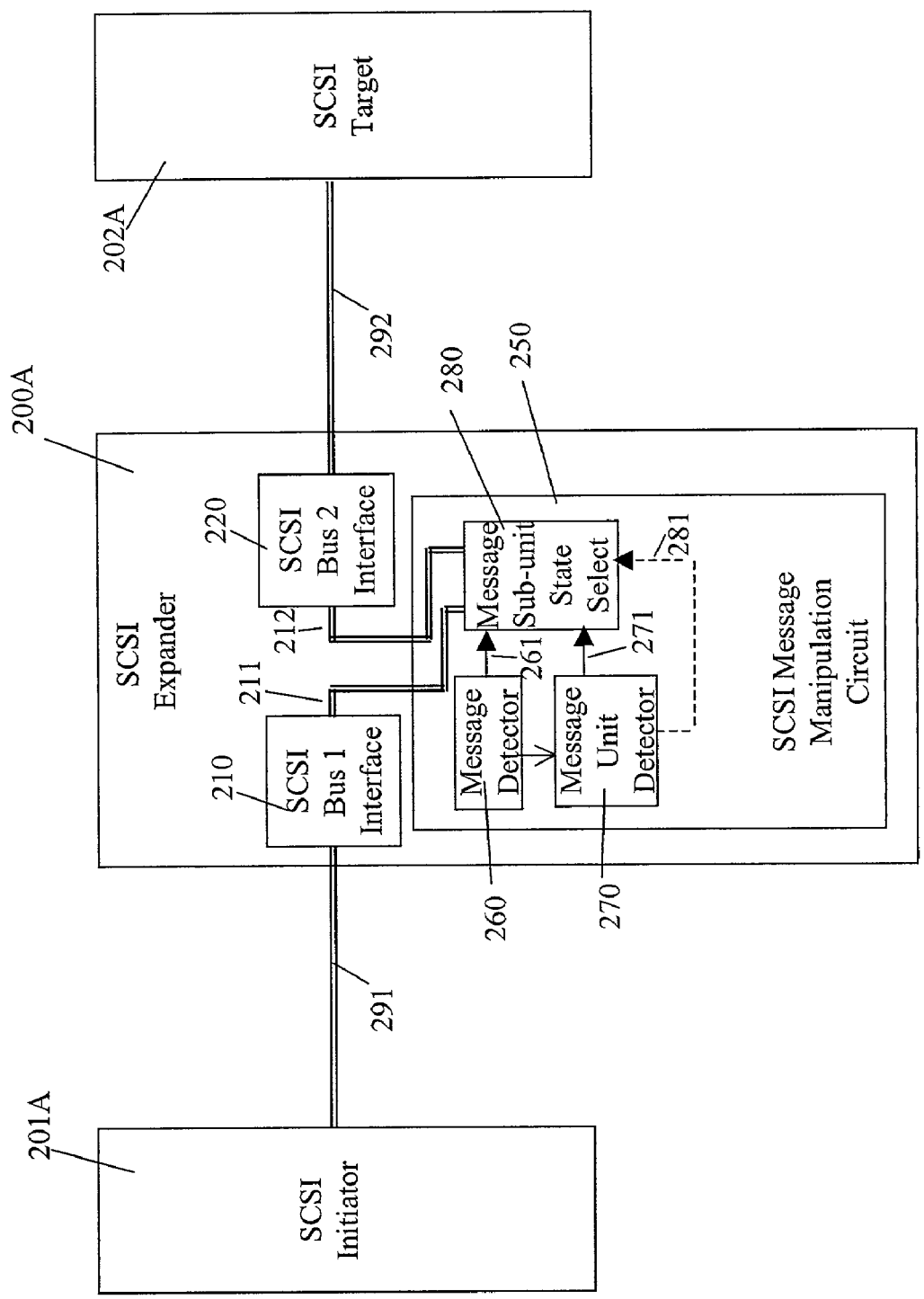
FIG. 2A is an illustration of a system that includes one embodiment of a SCSI expander of the present invention with a message manipulation circuit.

According to one embodiment of the present invention, a SCSI message manipulation circuit 250 in a SCSI expander 200A (FIG. 2A) detects a specified SCSI message from either a SCSI initiator 201, or a SCSI target 202. After detecting the specified SCSI message, SCSI message manipulation circuit 250 detects a pre-selected message-unit, e.g., a byte, within the message. Upon detecting the pre-selected message-unit, SCSI message manipulation circuit 250 sets a pre-selected sub-unit, e.g., a bit, within the pre-selected message-unit to a pre-selected state, which is programmable, as the SCSI message passes through SCSI expander 200A.

Specifically, the message content is manipulated on-the-fly, which means that the message is not stored, manipulated, and then released, as the message content is transferred through a device. The message manipulation circuit of this invention can be used in any device as the message is transferred through the device from an I/O bus or other communication medium.

A pre-selected sub-unit in a pre-selected unit is manipulated on-the-fly, in one embodiment. In another embodiment, multiple pre-selected sub-units in the pre-selected unit are manipulated on-the-fly. In still another embodiment, pre-selected sub-units in multiple pre-selected units are manipulated on-the-fly. In still another embodiment, any or all of these actions are performed on-the-fly on multiple messages. Hence, the use of a specific message, a specific pre-selected unit in that message, and a pre-selected sub-unit in that unit is illustrative only and is not intended to limit the invention to this specific embodiment.

In one embodiment, as explained more completely below, the specified SCSI message is a Parallel Protocol Request (PPR) message, the pre-selected message-unit is a specific byte in the PPR message, and the pre-selected sub-unit is the precompensation enable control bit P_EN in the specific byte. However, SCSI message manipulation circuit 250, or an equivalent of circuit 250 can be used for multiple SCSI messages as well as for multiple message-unit and sub-unit sizes within the messages. In general, message manipulation circuit 250 can be utilized in any configuration where it is desired to modify content of a message that is being transmitted between two devices, i.e., the message content is manipulated on-the-fly.

SCSI message manipulation circuit 250 does not affect any SCSI message other than the specified SCSI message. In addition, SCSI message manipulation circuit 250 does not adversely affect SCSI message throughput latency.

As explained more completely below, SCSI expander 200A can be used with any desired combination of SCSI devices with and without adjustable active filtering. Consequently, when SCSI message manipulation circuit 250 is included in any SCSI expander with or without adjustable active filtering, the prior art problems associated with a SCSI expander not supporting adjustable active filtering are eliminated without affecting the message handling performance of the SCSI expander. FIGS. 2B to 2E are illustrations of various system configurations with a SCSI expander 200B that does not support adjustable active filtering, but that does includes SCSI message manipulation circuit 250. In FIGS. 2B to 2E, SCSI buses 291 and 292 are illustrated separately for SCSI bus phases DATA IN and DATA OUT for convenience in illustrating the various states of precompensation enable bit P_EN for the various configurations, and this should not be interpreted as requiring two different buses to connect the expander of this invention to a SCSI device.

Prior art SCSI expander 100 supported a system configuration having only SCSI initiators and SCSI targets that did not support adjustable active filtering signal conditioning. As explained more completely below, any SCSI target or SCSI initiator independent of the type of signal conditioning supported can be used with SCSI expander 200B.

Figure 2B:
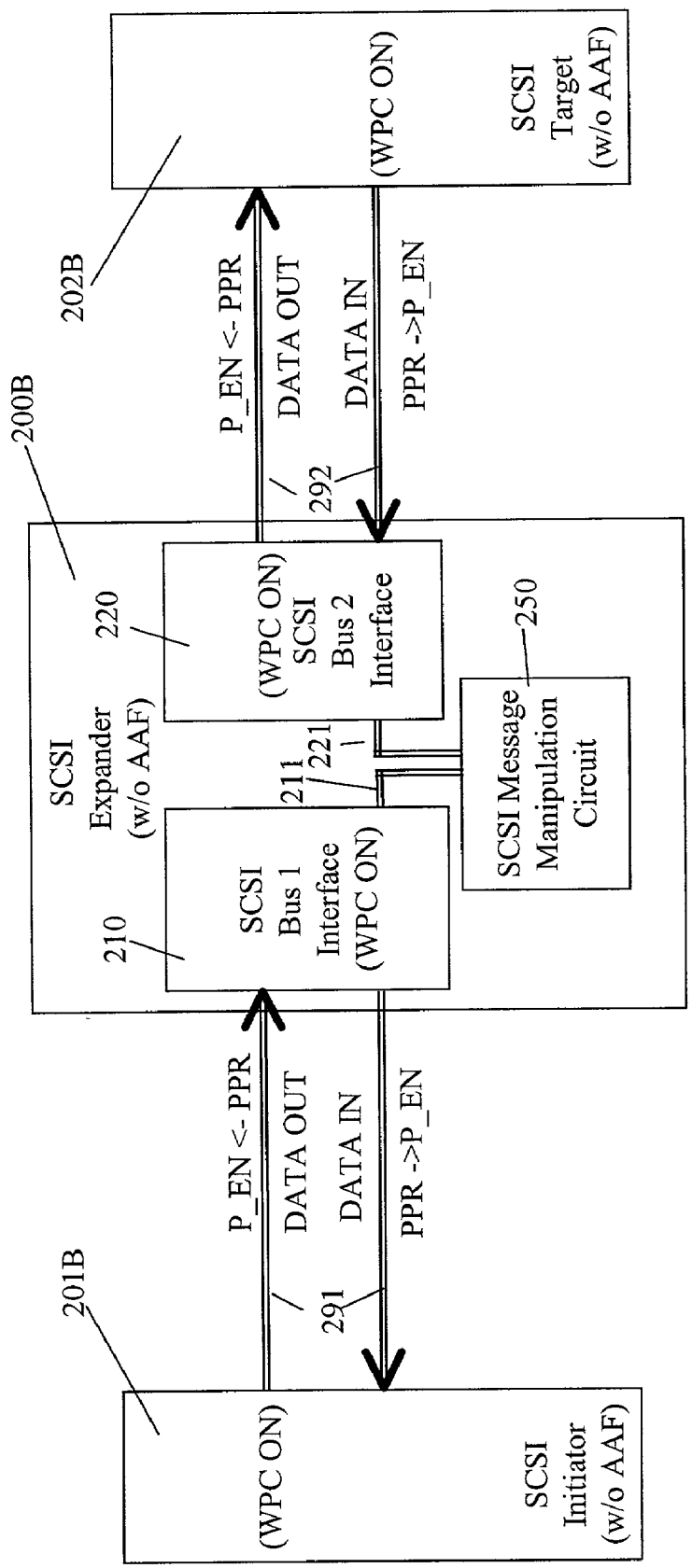
FIG. 2B is an illustration of a system that includes a SCSI initiator that does not support AAF signal conditioning, one embodiment of a SCSI expander of the present invention that does not support AAF signal conditioning, and a SCSI target that does not support AAF signal conditioning.

For example, in FIG. 2B, SCSI expander 200B (FIG. 2B) is used in a system configuration having only SCSI initiators and SCSI targets that do not support adjustable active filtering. For a SCSI bus phase DATA OUT, SCSI target 202B sets precompensation enable control bit P_EN in the PPR message that is passed to SCSI expander 200B. In SCSI expander 200B, the PPR message is passed through SCSI bus two interface 220, which turns on write precompensation, to SCSI message manipulation circuit 250. SCSI message manipulation circuit passes the PPR message without modification to SCSI bus one interface circuit 210 that in turns passes the unmodified PPR message to SCSI initiator 201B. In response to the PPR message, SCSI initiator 201B turns on write precompensation.

For a SCSI bus phase DATA IN, SCSI initiator 201B sets precompensation enable control bit P_EN in the PPR message that is passed to SCSI expander 200B. In SCSI expander 200B, the PPR message is passed through SCSI bus one interface 210, which turns on write precompensation, to SCSI message manipulation circuit 250. SCSI message manipulation circuit passes the PPR message without modification to SCSI bus two interface circuit 220 that in turns passes the unmodified PPR message to SCSI target 202B. In response to the PPR message, SCSI target 202B turns on write precompensation.

Hence, the system configuration of FIG. 2B works successfully with SCSI expander 200B. In addition, as shown below, when a system includes either a SCSI initiator, a SCSI target, or both that supports adjustable active filtering signal conditioning, SCSI expander 200B correctly interacts with each device.

Figure 2C:
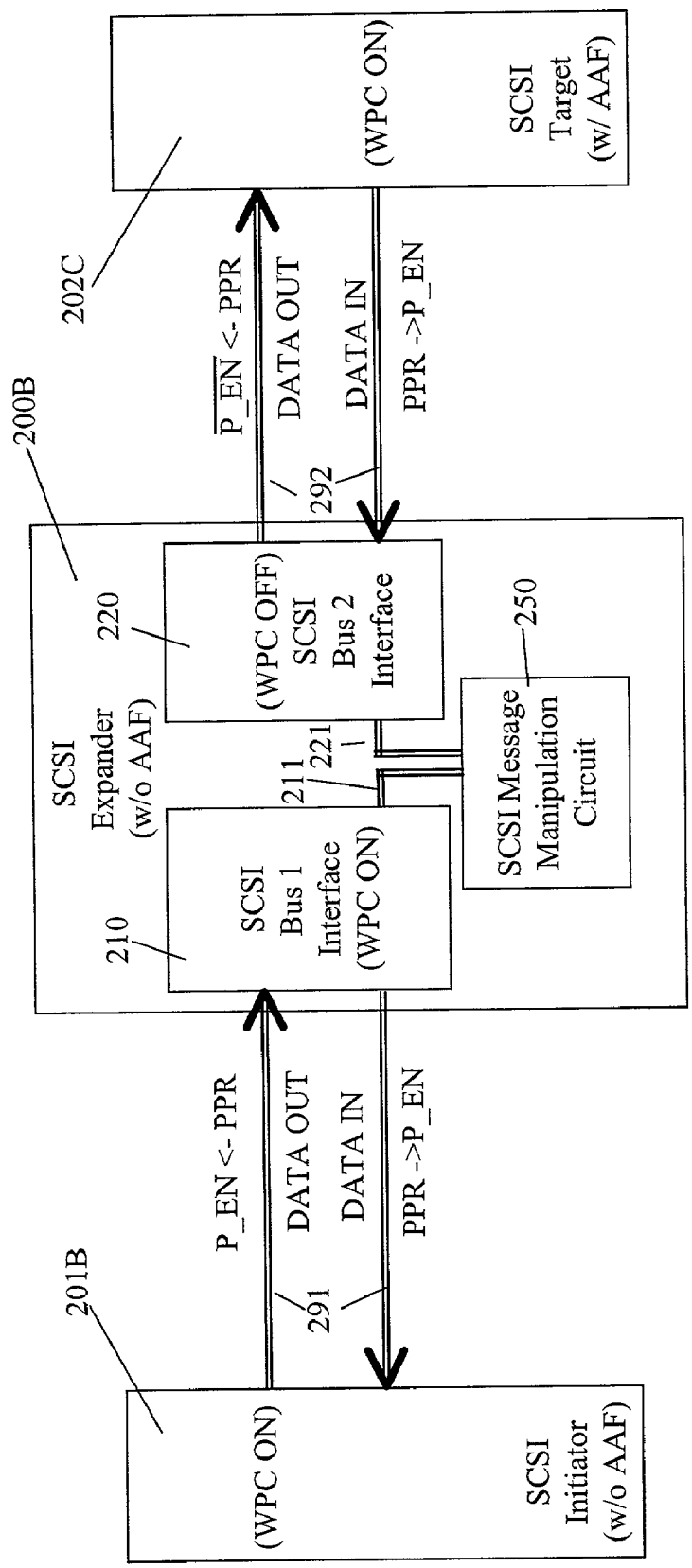
FIG. 2C is an illustration of a system that includes a SCSI initiator that does not support AAF signal conditioning, one embodiment of a SCSI expander of the present invention that does not support AAF signal conditioning, and a SCSI target that supports AAF signal conditioning.

In particular, as illustrated in FIG. 2C, SCSI target 202C supports adjustable active filtering and SCSI initiator 201B does not support adjustable active filtering. For a SCSI bus phase DATA OUT, SCSI target 202C negates precompensation enable control bit P_EN in the PPR message that is sent to SCSI expander 200B over SCSI bus 292. The PPR message is routed through SCSI bus two interface 220, which turns off write precompensation in response to the PPR message, and routes the PPR message to SCSI message manipulation circuit 250 that in turn routes a modified PPR message to SCSI bus one interface circuit 210.

SCSI message manipulation circuit 250, as explained more completely below, changes the state of precompensation enable control bit P_EN in the PPR message on-the-fly from negated to asserted. Otherwise, the message is passed unchanged by circuit 250 to SCSI bus one interface circuit 210. SCSI bus one interface circuit 210 passes the modified PPR message over SCSI bus 291 to SCSI initiator 201B that in turn turns on write precompensation. Hence, the modified PPR message correctly indicates to SCSI initiator 201B that SCSI expander 202B requires write precompensation.

For a SCSI bus phase DATA IN (FIG. 2C), SCSI initiator 201B sets precompensation enable control bit P_EN in the PPR message that is passed to SCSI expander 200B. In SCSI expander 200B, the PPR message is passed through SCSI bus one interface 210, which turns on write precompensation, to SCSI message manipulation circuit 250. SCSI message manipulation circuit passes the PPR message without modification to SCSI bus two interface circuit 220 that in turns passes the unmodified PPR message to SCSI target 202C. In response to the PPR message, SCSI target 202C turns on write precompensation. Hence, unlike the prior art system of FIG. 1B, the correct signal conditioning is used for each segment of the path between SCSI initiator 201B that does not support adjustable active filtering to SCSI target 202C that supports adjustable active filtering.

Figure 2D:
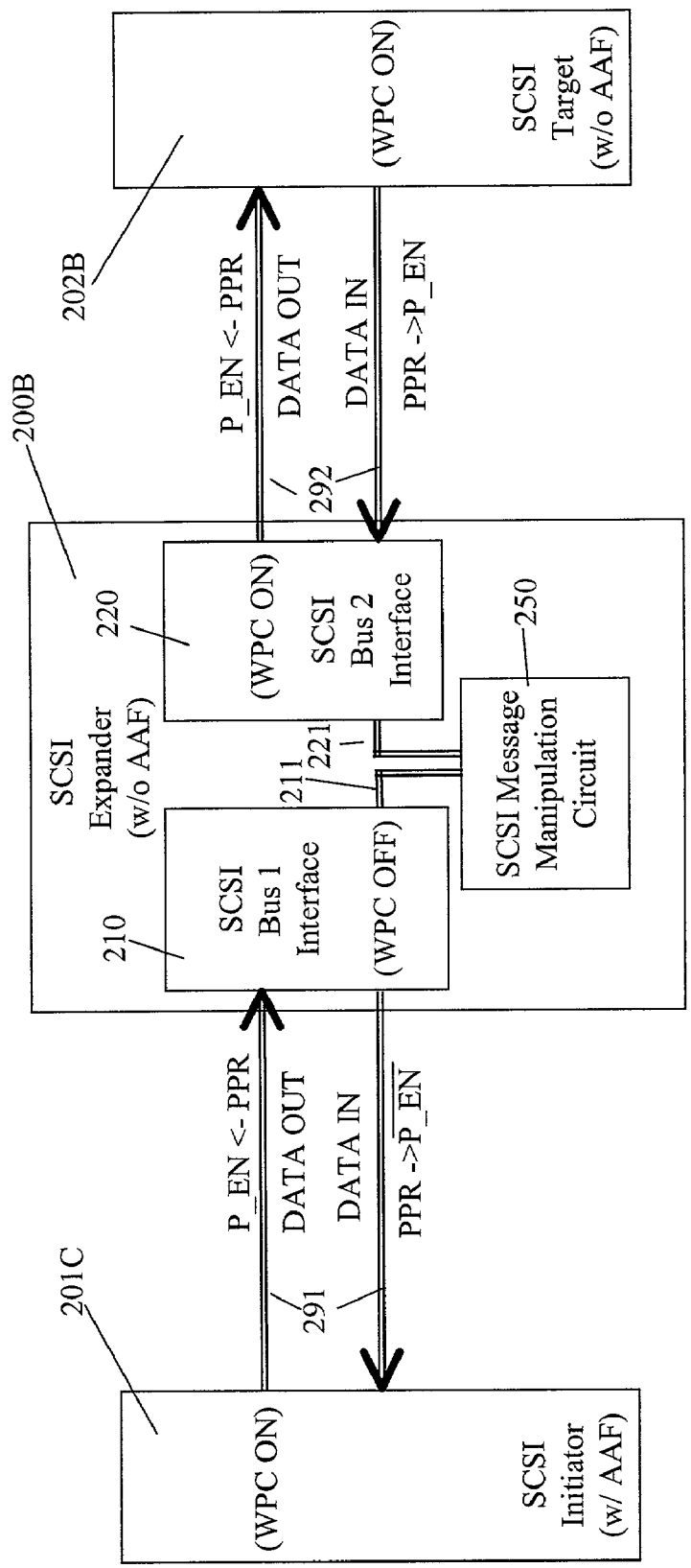
FIG. 2D is an illustration of a system that includes a SCSI initiator that supports AAF signal conditioning, one embodiment of a SCSI expander of the present invention that does not support AAF signal conditioning, and a SCSI target that does not support AAF signal conditioning.

As illustrated in FIG. 2D, SCSI initiator 201C uses adjustable active filtering and SCSI target 202B does not support adjustable active filtering. For a SCSI bus phase DATA OUT, SCSI target 202B sets precompensation enable control bit P_EN in the PPR message that is passed to SCSI expander 200B. In SCSI expander 200B, the PPR message is passed through SCSI bus two interface 220, which turns on write precompensation, to SCSI message manipulation circuit 250. SCSI message manipulation circuit passes the PPR message without modification to SCSI bus one interface circuit 210 that in turns passes the unmodified PPR message to SCSI initiator 201C. In response to the PPR message, SCSI initiator 201C turns on write precompensation.

For a SCSI bus phase DATA IN (FIG. 2D), SCSI initiator 201C negates precompensation enable control bit P_EN in the PPR message that is sent to SCSI expander 200B over SCSI bus 291. SCSI bus one interface 210, which turns off write precompensation, routes the PPR message to SCSI message manipulation circuit 250 that in turn routes a modified PPR message to SCSI bus two interface circuit 220.

SCSI message manipulation circuit 250, as explained more completely below, changes the state of precompensation enable control bit P_EN in the PPR message. Otherwise, the message is passed unchanged by circuit 250. SCSI bus two interface circuit 220 passes the modified PPR message over SCSI bus 292 to SCSI target 202C. Hence, the PPR modified message correctly indicates to SCSI target 202B that SCSI expander 202B requires write precompensation. Hence, unlike the prior art system of FIG. 1C, the correct signal conditioning is used for each segment of the path between SCSI initiator 201C that supports adjustable active filtering to SCSI target 202B that does not support adjustable active filtering.

Figure 2E:
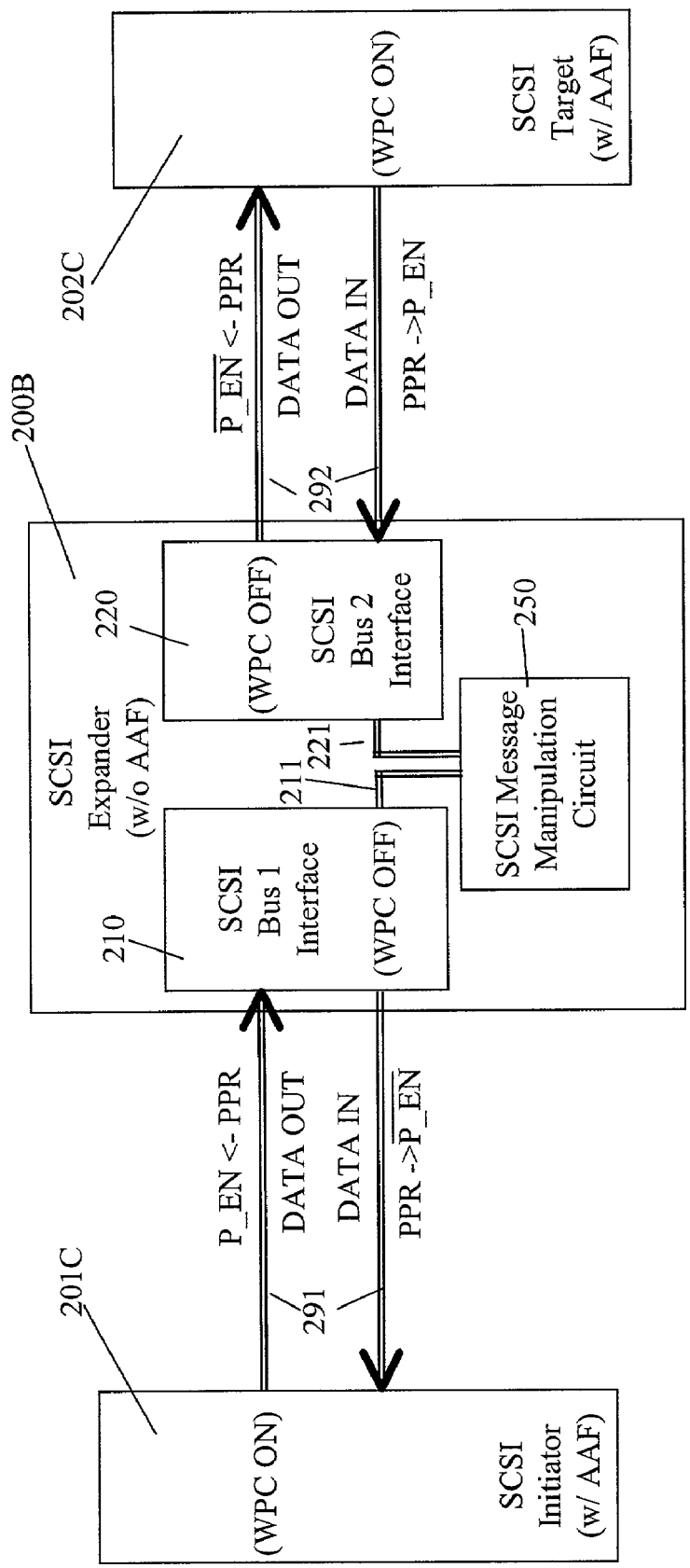
FIG. 2E is an illustration of a system that includes a SCSI initiator that supports AAF signal conditioning, one embodiment of a SCSI expander of the present invention that does not support AAF signal conditioning, and a SCSI target that supports AAF signal conditioning.
Figure 2F:
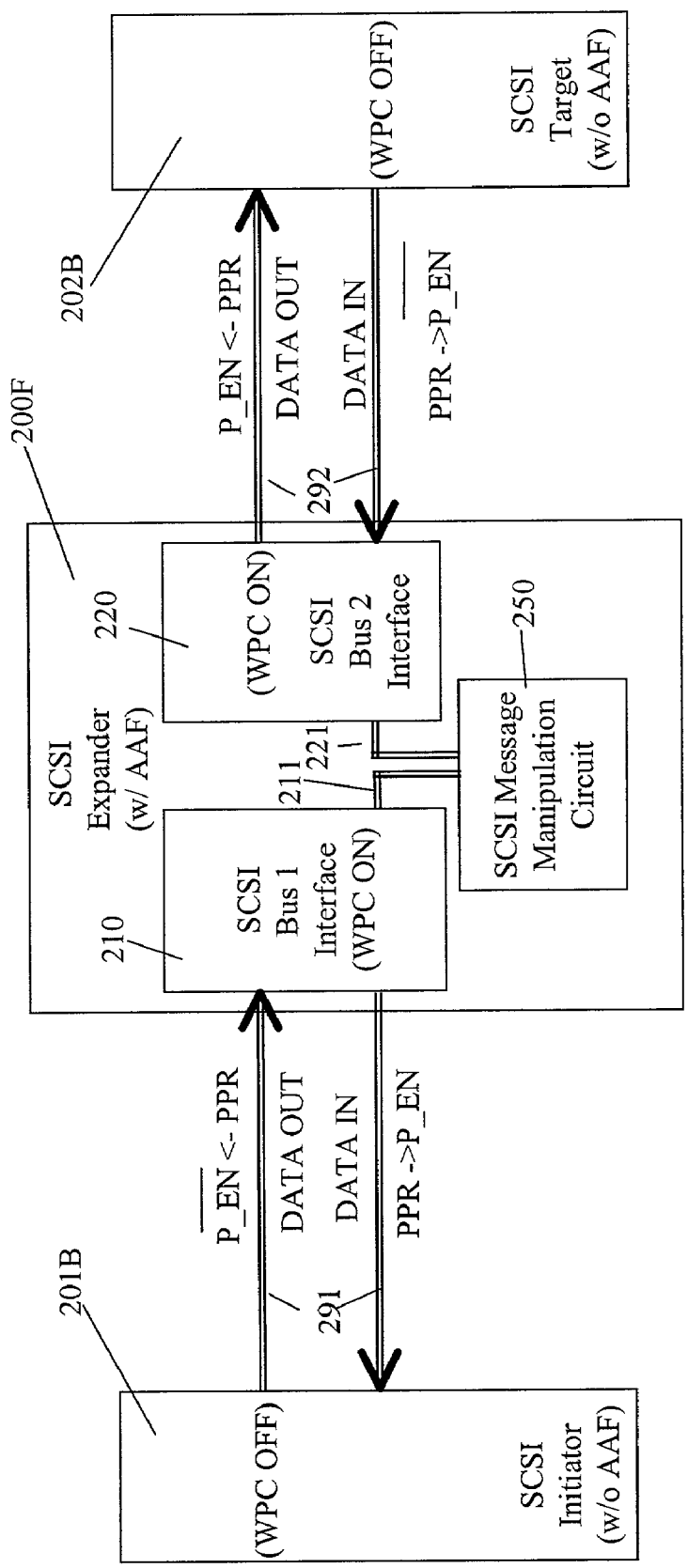
FIG. 2F is an illustration of a system that includes a SCSI initiator that does not support AAF signal conditioning, one embodiment of a SCSI expander of the present invention that supports AAF signal conditioning, and a SCSI target that does not support AAF signal conditioning.
Figure 2G:
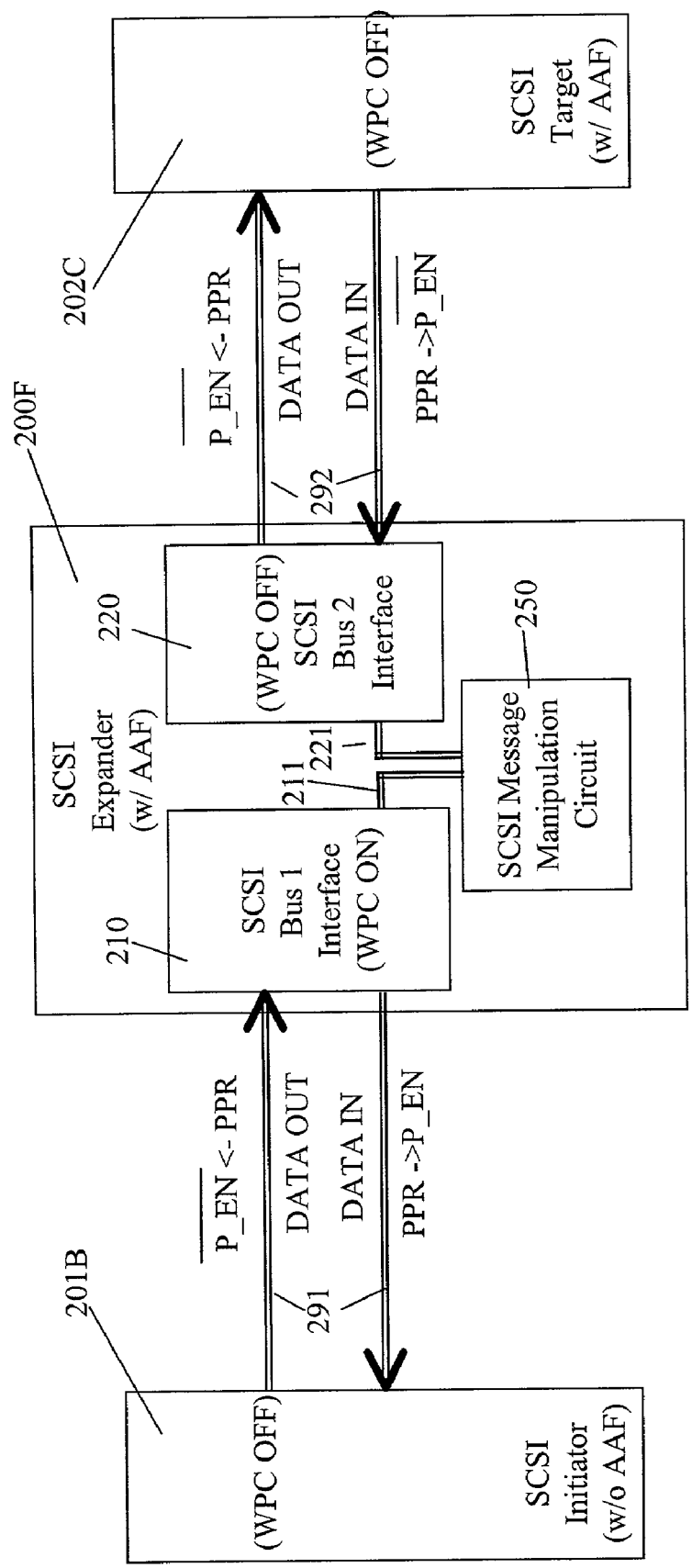
FIG. 2G is an illustration of a system that includes a SCSI initiator that does not support AAF signal conditioning, one embodiment of a SCSI expander of the present invention that supports AAF signal conditioning, and a SCSI target that supports AAF signal.
Figure 2H:
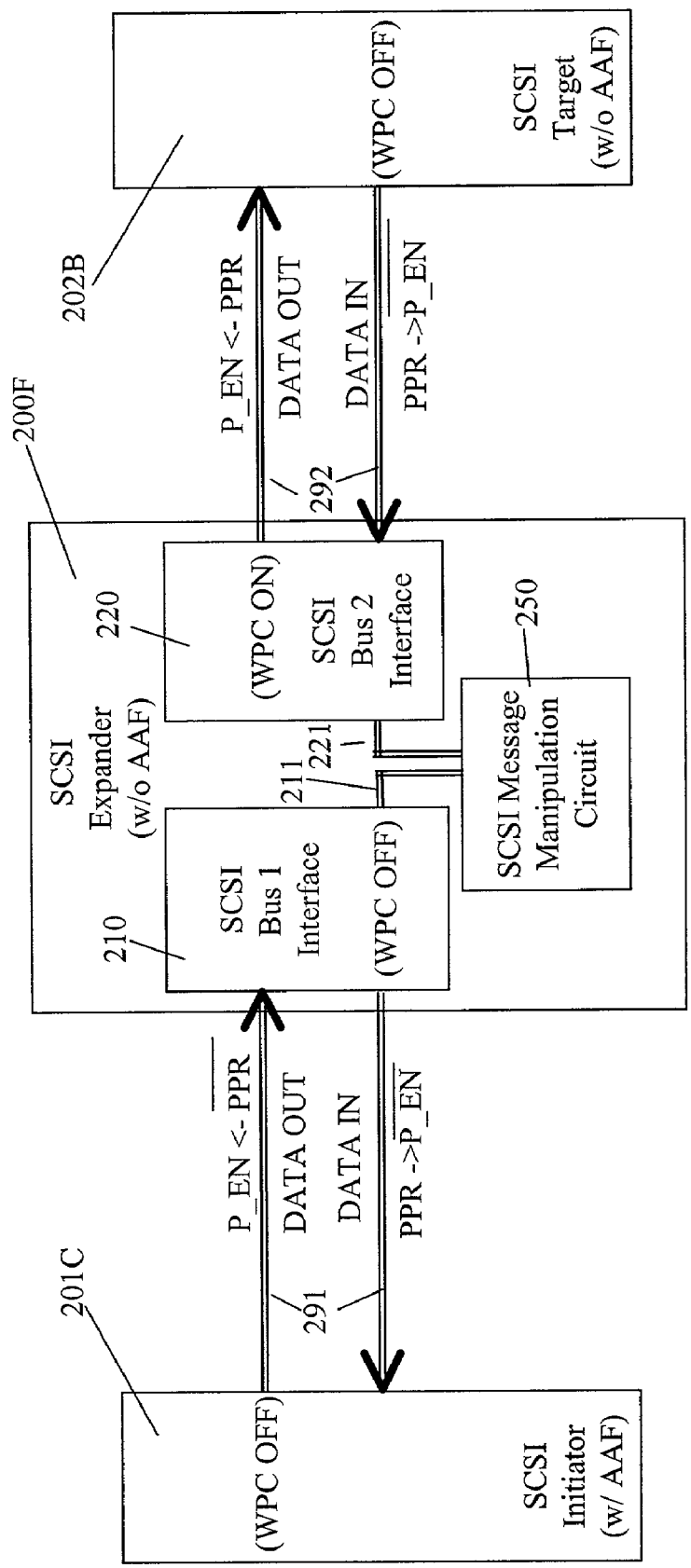
FIG. 2H is an illustration of a system that includes a SCSI initiator that supports AAF signal conditioning, one embodiment of a SCSI expander of the present invention that supports AAF signal conditioning, and a SCSI target that does not support AAF signal conditioning.
Figure 2I:
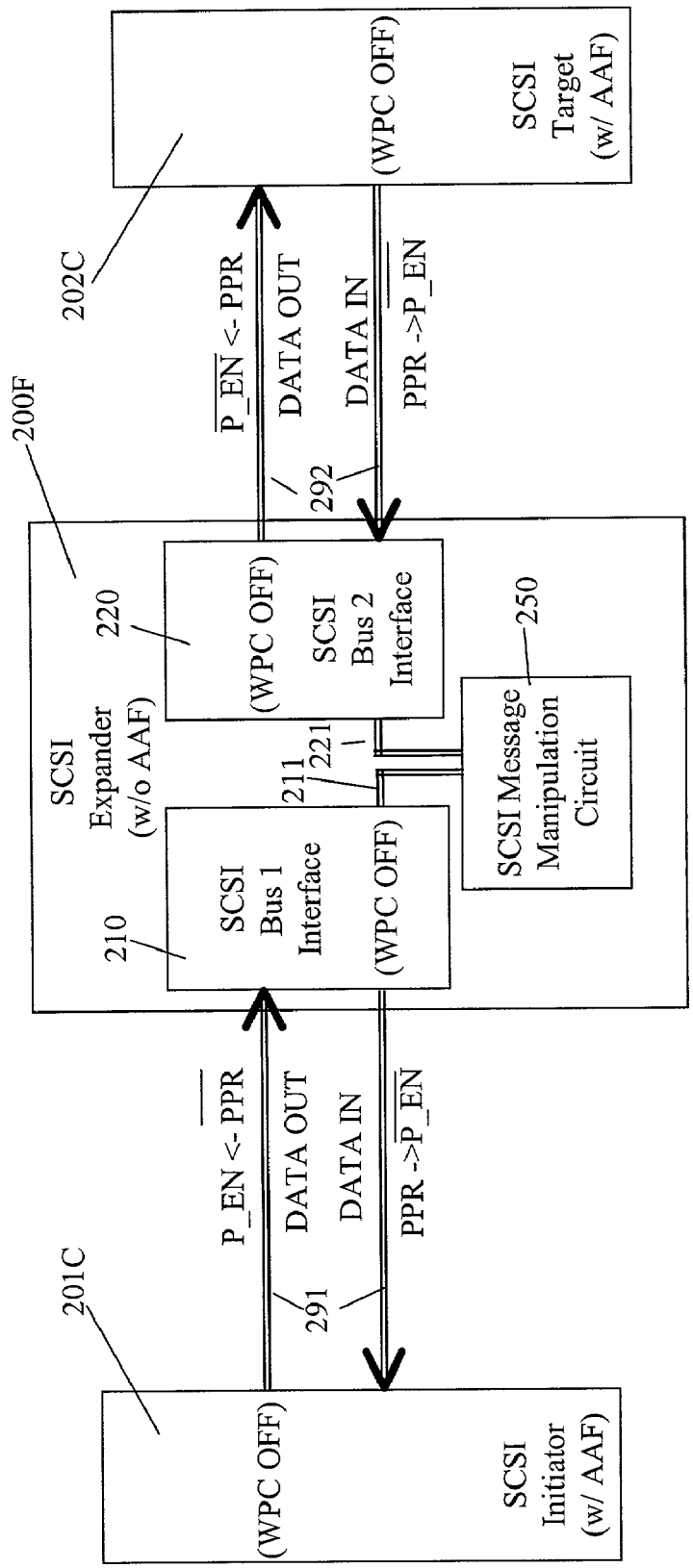
FIG. 2I is an illustration of a system that includes a SCSI initiator that supports AAF signal conditioning, one embodiment of a SCSI expander of the present invention that supports AAF signal conditioning, and a SCSI target that supports AAF signal conditioning.

As illustrated in FIG. 2E, both SCSI initiator 201C and SCSI target 202C support adjustable active filtering. For a SCSI bus phase DATA OUT, SCSI target 202C negates precompensation enable control bit P_EN in the PPR message that is sent to SCSI expander 200B over SCSI bus 292. The PPR message is routed through SCSI bus two interface 220, which turns off write precompensation in response to the PPR message, and routes the PPR message to SCSI message manipulation circuit 250 that in turn routes a modified PPR message to SCSI bus one interface circuit 210.

SCSI message manipulation circuit 250, as explained more completely below, changes the state of precompensation enable control bit P_EN in the PPR message on-the-fly from negated to asserted. Otherwise, the message is passed unchanged by circuit 250 to SCSI bus one interface circuit 210. SCSI bus one interface circuit 210 passes the modified PPR message over SCSI bus 291 to SCSI initiator 201C that in turn turns on write precompensation. Hence, the modified PPR message correctly indicates to SCSI initiator 201C that SCSI expander 200B requires write precompensation.

For a SCSI bus phase DATA IN (FIG. 2E), SCSI initiator 201C negates precompensation enable control bit P_EN in the PPR message that is sent to SCSI expander 200B over SCSI bus 291. SCSI bus one interface 210, which turns off write precompensation, routes the PPR message to SCSI message manipulation circuit 250 that in turn routes a modified PPR message to SCSI bus two interface circuit 220.

SCSI message manipulation circuit 250, as explained more completely below, changes the state of precompensation enable control bit P_EN in the PPR message. Otherwise, the message is passed unchanged by circuit 250. SCSI bus two interface circuit 220 passes the modified PPR message over SCSI bus 292 to SCSI target 202C. Hence, the PPR modified message correctly indicates to SCSI target 202C that SCSI expander 202B requires write precompensation. Hence, unlike the prior art system of FIG. 1D, the correct signal conditioning is used for each segment of the path between SCSI initiator 201C that does support adjustable active filtering to SCSI target 202C that also supports adjustable active filtering.

Prior art FIGS. 1A to 1D illustrated the problems encountered when a SCSI expander 102 that did not support adjustable active filtering was used in systems that included devices that utilized adjustable active filtering signal conditioning. TABLE 1 summarizes the problems when the prior art SCSI expander 102 is replaced with a prior art SCSI expander that supports adjustable active filtering (not shown).

TABLE 1

Prior Art SCSI Expander that Supported Adjustable Active Filtering

| Initiator Signal Conditioning | Target Signal Conditioning | SCSI Bus Phase | P_EN State in Message to Expander (Prior Art) | P_EN State in Message From Expander (Prior Art) |
|---|---|---|---|---|
| WPC (FIG. 1A) | WPC | Data Out | Asserted | Asserted (Incorrect) |
| | | Data In | Asserted | Asserted (Incorrect) |
| WPC (FIG. 1B) | AAF | Data Out | Negated | Negated |
| | | Data In | Asserted | Asserted (Incorrect) |
| AAF (FIG. 1C) | WPC | Data Out | Asserted | Asserted (Incorrect) |
| | | Data In | Negated | Negated |
| AAF | AAF | Data | Negated | Negated |

TABLE 1-continued

Prior Art SCSI Expander that Supported Adjustable Active Filtering

| Initiator Signal Conditioning | Target Signal Conditioning | SCSI Bus Phase | P_EN State in Message to Expander (Prior Art) | P_EN State in Message From Expander (Prior Art) |
|---|---|---|---|---|
| (FIG. 1D) | | Out Data In | Negated | Negated |

Hence, as shown by TABLE 1, the prior art SCSI expander that supported adjustable active filtering could only be used successfully in systems where both the SCSI initiators and the SCSI targets supported adjustable active filtering signal conditioning.

In another embodiment of this invention, SCSI expander 200B in FIGS. 2B to 2E is replaced with another SCSI expander 200F that supports adjustable active filtering signal conditioning. With SCSI expander 200F, the problems in TABLE 1 are eliminated, as illustrated by TABLE 2. FIGS. 2F to 2I are illustrations of various system configurations in TABLE 2 for a SCSI expander 200F that supports adjustable active filtering and also includes SCSI message manipulation circuit 250.

TABLE 2

SCSI Expander that Supports Adjustable Active Filtering, and includes SCSI Message Manipulation Circuit

| Initiator Signal Conditioning | Target Signal Conditioning | SCSI Bus Phase | P_EN State in Message to Expander | P_EN State In Message From Expander |
|---|---|---|---|---|
| WPC (FIG. 2F) | WPC | Data Out | Set | Negated |
| | | Data In | Set | Negated |
| WPC (FIG. 2G) | AAF | Data Out | Negated | Negated |
| | | Data In | Set | Negated |
| AAF (FIG. 2H) | WPC | Data Out | Set | Negated |
| | | Data In | Negated | Negated |
| AAF (FIG. 2I) | AAF | Data Out | Negated | Negated |
| | | Data In | Negated | Negated |

Hence, a SCSI expander 200F, which supports adjustable active filtering and includes SCSI message manipulation circuit 250, changes the state of precompensation enable control bit P_EN in the PPR message to correctly indicate the type of signal conditioning required to communicate successfully with SCSI expander 200F as illustrated in FIGS. 2F to 2I for each of the prior art incompatible configurations of TABLE 1. Conversely, for configurations that did not result in an incompatible configuration, SCSI expander 220F passes the PPR message through unmodified.

Returning to FIG. 2A, SCSI message manipulation circuit 250, in this embodiment, includes a message detector module 260 that detects when a selected message is being passed between a SCSI initiator and a SCSI target through SCSI expander 200A. In more general terms, a message detector module detects a pre-selected message passing through a device. Upon detection of a message, module 260 generates an active signal on a message-detected line 261 to message sub-unit state selection module 280. Module 260, in some embodiments, also enables circuitry in message-unit detector module 270.

Herein, an active signal does not indicate any particular logic level. Each line in a circuit typically has a specific logic level defined as the active level and the negated logic level is the inactive level. Thus, an active signal for a particular line means the specific logic level defined as the active level for that line.

Message-unit detector module 270, in one embodiment, is programmably configured to detect a specified message-unit, sometimes called a pre-selected message-unit, in the detected message. In another embodiment, module 270 is hard-wired, sometimes called hard-coded, to detect a pre-selected message-unit in the detected message.

Here, a message-unit is a basic size metric associated with the message, e.g., a byte, a word, a double word, etc., or perhaps a particular packet in a multi-packet message. When the pre-selected message-unit of the message is detected, message-unit detector 270 generates an active signal on message-unit detected line 271 to message sub-unit state selection module 280.

In addition to input lines 261 and 271, message sub-unit state selection module 280 includes an optional enable input line 281 that is used in some embodiments. When the signals on input lines 261, 271 and 281 are active, in one embodiment, message sub-unit state selection module 280 sets the state of a programmably pre-selected sub-unit of the pre-selected message-unit in the message to a programmably selected state as the pre-selected message-unit is passed through expander 200A. In another embodiment, the selected sub-unit is hard-coded in module 280. In still another embodiment, enable input line 281 is not used and when the signals on lines 261 and 271 are both active, message sub-unit state selection module 280 sets the state of a programmably pre-selected sub-unit of the pre-selected message-unit in the message to a programmably selected state as the pre-selected message-unit is passed through expander 200A.

When expander 200A is used for detecting a SCSI PPR message, the pre-selected message-unit is a specific byte in the message containing a precompensation enable control bit, and the sub-unit is the precompensation enable control bit. The state of the precompensation enable control bit is set based upon the type of signal conditioning supported by expander 200A.

Figure 3:
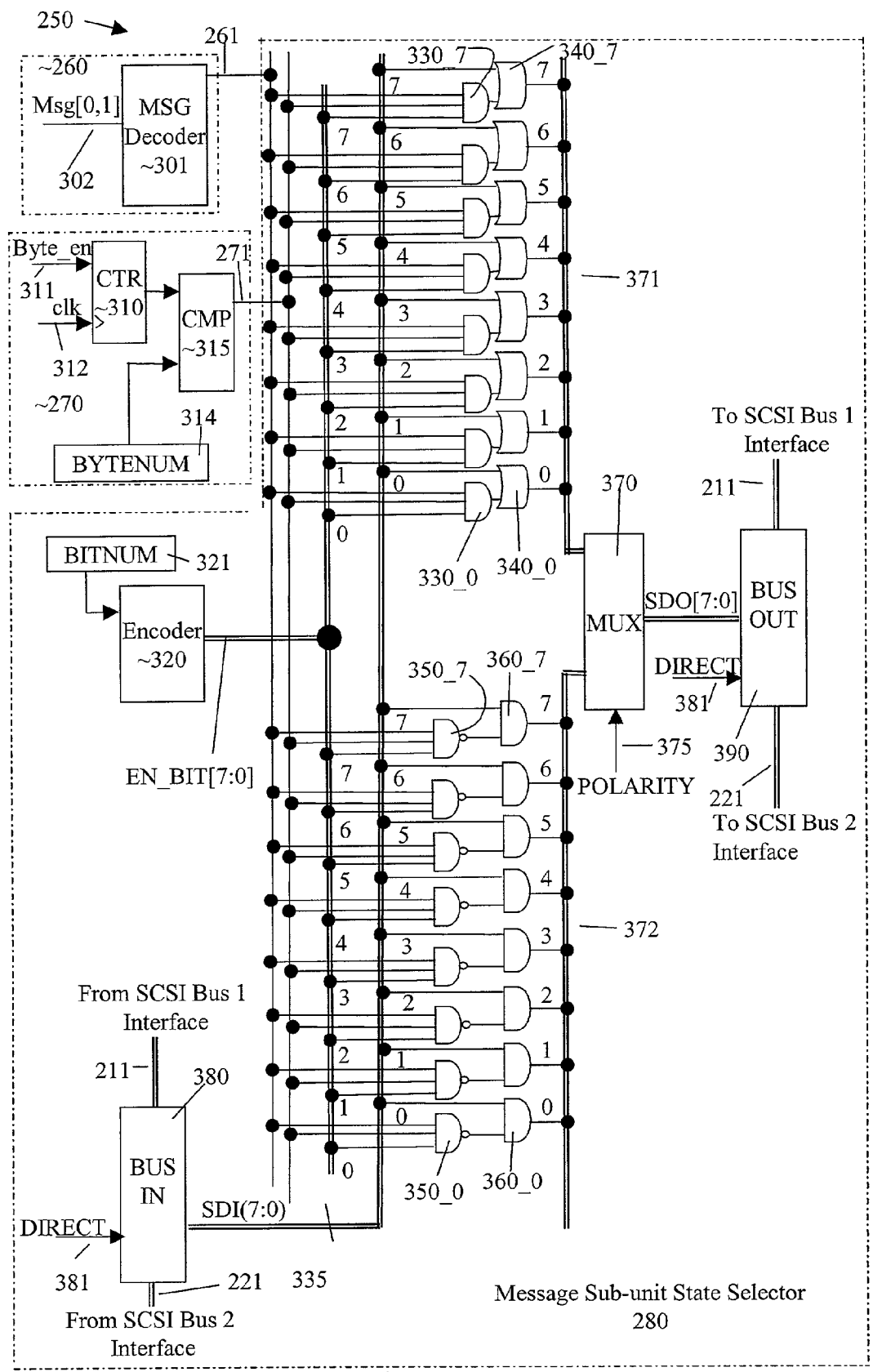
FIG. 3 is a detailed diagram of one embodiment of the SCSI message manipulation circuit of the present invention.

FIG. 3 is a more detailed diagram of one embodiment of SCSI message manipulation circuit 250 of this invention. This embodiment permits setting a bit in a message byte to a selected state. The bit in the message byte, the message byte, and the state of the bit are programmably selectable, in this embodiment, i.e., are pre-selected.

Bus-in selector 380 passes the signals on one of buses 211 from SCSI bus one interface circuit 210 and bus 221 from SCSI bus two interface circuit 220 to an input bus SDI[7:0] that includes a plurality of input lines. A signal level on a line DIRECT is used to select which of the two buses 211 and 221 is connected to bus SDI[7:0]. The signal level on line DIRECT is determined by the direction of data transfer through SCSI expander 200.

In one embodiment, bus-in selector 380 is a multiplexer. In another embodiment, bus-in selector 380 is included within each of bus-interface circuits 210 and 220 and so input bus SDI[7:0] is connected to each of bus-interface circuits 210 and 220. The particular way that the input signals are selected and driven on input bus SDI[7:0] is not essential to this invention.

Each input line of bus SDI[7:0] is connected to a first input terminal of a different OR gate in a plurality of OR gates 340_0 to 340_7, e.g., a first plurality of logic gates, and to a first input terminal of a different AND gate in a plurality of AND gated 360_0 to 360_7, e.g., a second plurality of logic gates.

Each output line of an OR gate in plurality of OR gates 340_0 to 340_7 drives a different line in a bus 371 to multiplexer 370. Each output line of an AND gate in plurality of AND gates 360_0 t 360_7 drives a different line in a bus 372 to multiplexer 370. The signals driven on output bus SDO[7:0] from one of buses 371 and 372 are selected by a level of a signal POLARITY on line 375.

In one embodiment, if circuit 250 is included in an expander that does not support active adjustable filtering, the level of signal POLARITY is set, e.g., set active, so that multiplexer 370 connects bus 371 to output bus SDO[7:0] and disconnects bus 372 from output bus SDO[7:0]. Conversely, if circuit 250 is included in an expander that supports adjustable active filtering, the level of signal POLARITY is set, e.g., set inactive, so that multiplexer 370 connects bus 372 to output bus SDO[7:0] and disconnects bus 371 from output bus SDO[7:0]. The state of the signal on line 375 could be programmed by an on-chip processor, loaded from an external source such as a SCSI initiator, or a host system, or alternatively hard-coded.

In general, an output terminal of each OR gate in plurality of OR gates 340_0 to 340_7 is selectively coupled to and selectively decoupled from a different output line of output bus SDO[7:0] by multiplexer 370. Similarly, an output terminal of each AND gate in plurality of AND gates 360_0 to 360_7 is selectively coupled to and selectively decoupled from a different output line of output bus SDO[7:0] by multiplexer 370, in this embodiment.

Output bus SDO[7:0] is connected to one of buses 211 and bus 221, in this embodiment, by a bus-out selector 390. One of buses 211 and 221 is selected by the signal level on line DIRECT and is the opposite of the bus selected by bus-in selector 380. Again, the particular way the signals on bus SDO[7:0] are output from SCSI expander 200A is not essential to this invention.

A second input terminal of each OR gate in plurality of OR gates 340_0 to 340_7 is connected to an output terminal of a different AND gate in a plurality of AND gates 330_0 to 330_7, e.g., a third plurality of logic gates. As explained more completely below, except when a message is being processed, the output signals from plurality of AND gates 330_0 to 330_7 are always inactive, e.g., low, so that plurality of OR gates 340_0 to 340_7 pass the signals on bus SDI[7:0] to bus 371.

A second input terminal of each AND gate in plurality of AND gates 360_0 to 360_7 is connected to an output terminal of a different NAND gate in a plurality of NAND gates 350_0 to 350_7, e.g., a fourth plurality of logic gates. As explained more completely below, except when a message is being processed, the output signals from plurality of NAND gates 350_0 to 350_7 are always active, e.g., high, so that plurality of AND gates 360_0 to 360_7 pass the signals on bus SDI[7:0] to bus 372.

Hence, independent of the state of signal POLARITY on line 375, during non-message processing operation of expander 200A, circuit 250 passes the data without modification from input bus SDI[7:0] to output bus SDO[7:0]. Preferably, circuit 250 is designed such that the data timing of pass-through signals is not corrupted, which can be done with conventional design and layout tools.

A message decode circuit 301 monitors information passing through expander 200A on line 302. As is known to those of skill in the art, monitoring the SCSI bus phase and request and acknowledge signals on the SCSI bus are used to determine when a message is present. Moreover, in the message phase, the specific byte sequences are specified by the SCSI specification and also are known to those of skill in the art. Message decode circuit 301 detects the first two bytes of a PPR message, and in response thereto drives an active signal on message-detected line 261 for the duration of the message. At other times, the signal level on line 261 from message decoder 301 is inactive, in this embodiment. Message detected line 261 is connected to a first input terminal of each AND in plurality of AND gates 330_0 to 330_7 and to a first input terminal of each NAND gate in plurality of NAND gates 350_0 to 350_7.

After a message is detected by decoder 301, an active signal is driven on line BYTE_EN to a counter 310. Counter is 310 is clocked by a signal CLK on line 312 to counter 310 as each byte is transferred to expander 200A.

Figure 4A:
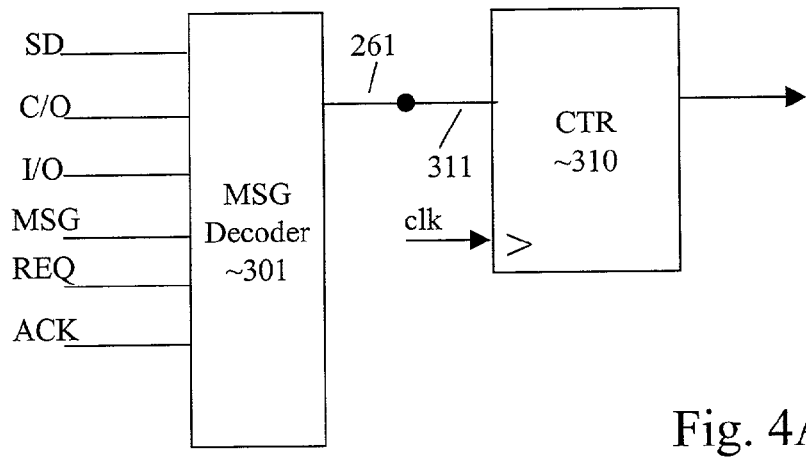
FIG. 4A is one embodiment of clocking the counter of FIG. 3.

Various alternative embodiments can be used to clock counter 310. In a first embodiment, illustrated in FIG. 4A, signal CLK is generated using the request signal REQ or acknowledge signal ACK depending on the direction of data transfer, as illustrated in FIG. 4C. In this embodiment, line 261 is connected directly to line 311.

Figure 4B:
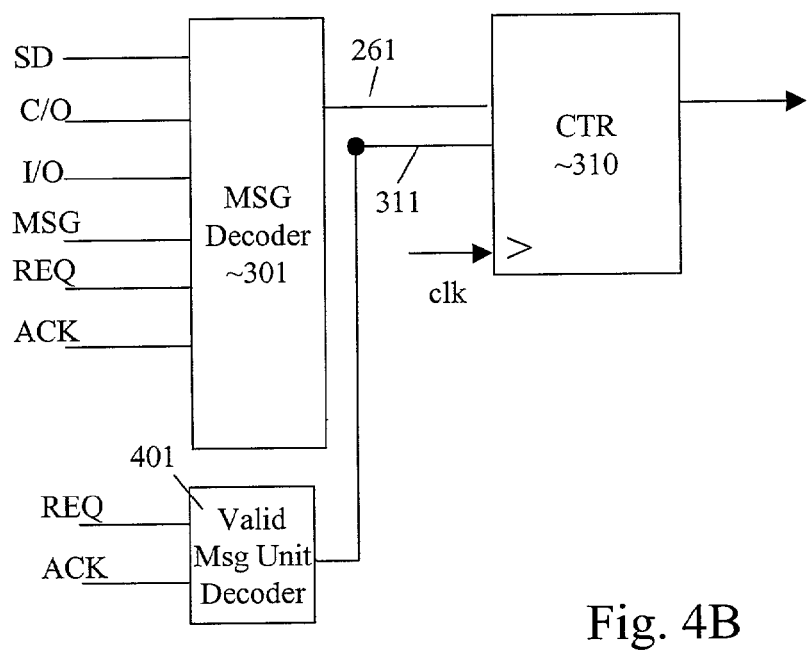
FIG. 4B is another embodiment of clocking the counter of FIG. 3.
Figure 4C:
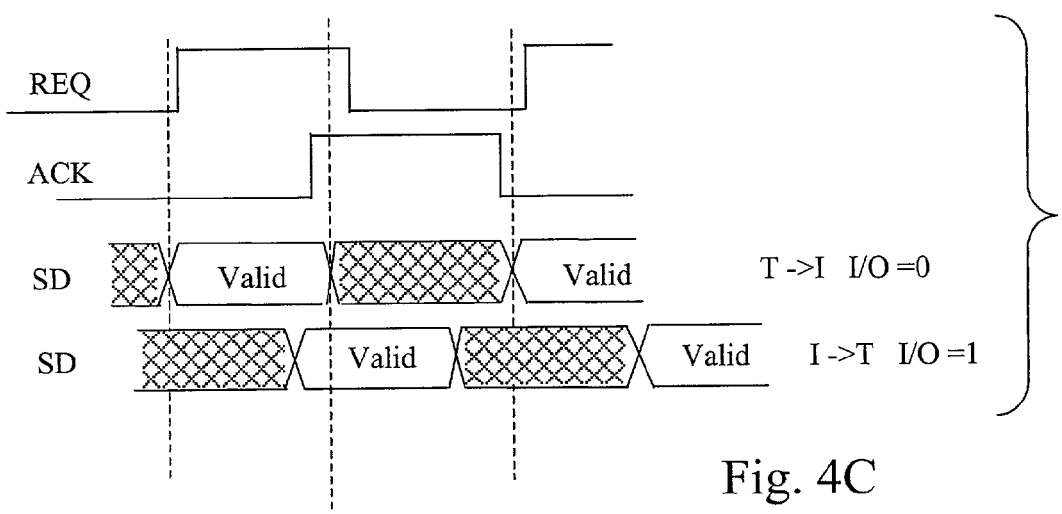
FIG. 4C is a timing diagram for assisting in the understanding of the clocking of the counter of FIG. 3.

In the embodiment of FIG. 4B, signal CLK is a free running clock. In this embodiment, counter 310 receives the enable signal on line 261 and in addition receives a count enable signal on line 311 from valid message unit decoder 401. In addition, for the message of interest in this embodiment, counter 310 is either loaded with a value of two, or alternatively, the value loaded in message-unit selection register 314 is the number bytes after counter 310 starts to count, and not the specific number of bytes in the message. In view of these examples, those of skill in the art can implement various configurations to provide the proper signal level and timing on line 271.

Hence, counter 310 counts each byte in the PPR message following detection of the message. The value of counter 310 is a first input to a comparator 315. A second input to comparator 315 is a value BYTENUM in a message-unit selection register 314. Register 314 could be loaded by an on-chip processor, loaded from an external source such as a SCSI initiator, or a host system, or alternatively hard-coded. The way that a particular value is loaded in message-unit selection register 314 is not essential to this invention.

When the value from counter 310 equals value BYTE-NUM, e.g., when a value of counter 310 has a predefined relationship to the value stored in register 314, comparator 315 generates an active signal on message-unit detected line 271. This indicates that the message-unit containing the sub-unit of interest is on input bus SDI[7:0]. Alternatively, the signal on line 271 could indicate that the next message-unit on bus SDI[7:0] is the message-unit of interest. Again, the particular way chosen to modify the message-unit on-the-fly depends on the timing constraints introduced by the circuit in combination with the timing requirements for the buses connected to the expander.

Message-unit detected line 271 is connected to a second input terminal of each AND gate in plurality of AND gates 330_0 to 330_7 and to a second input terminal of each NAND gate in plurality of NAND gates 350_0 to 350_7. Hence, circuit 250 detects a message and then a particular message-unit within the message, e.g., a pre-selected byte within the message, as indicated by the output signals from decoder 301 and comparator 315, respectively.

A value BITNUM in a sub-unit selection register 321 is a first input to an encoder 320. Encoder 320 drives an enable sub-unit output bus EN_BIT[7:0]. Specifically, encoder 320 drives an active signal on the line of enable sub-unit output bus EN_BIT[7:0] corresponding to value BITNUM in register 321 and the signals on the other lines of bus EN_BIT [7:0] are held inactive.

Each line of enable sub-unit output bus EN_BIT[7:0] is connected to a third input terminal of a different AND gate in plurality of AND gates 330_0 to 330_7 and to a third input terminal of a different NAND gate in plurality of NAND gates 350_0 to 350_7. Hence, the AND gate corresponding to the value in register 321 receives the active signal from encoder 320, and generates an active signal on the second input terminal of the OR gate to which it is connected. This OR gate, in turn, generates an active signal on the line of bus 371 corresponding to the value in register 321. Similarly, the NAND gate corresponding to the value in register 321 receives the active signal from encoder 320, and generates an active signal on the second input terminal of the AND gate to which it is connected. This AND gate, in turn, generates an inactive signal on the line of bus 372 corresponding to the value in register 321. Hence, the sub-unit of bus 371 that is defined by the value in sub-unit selection register 321 is set to a first selected value, and the sub-unit of bus 372 that is defined by the value in sub-unit selection register 321 is set to a second selected value.

Various alternative embodiments of the SCSI message manipulation circuit can be implemented in view of this disclosure. For example, if circuit 250 is being implemented in an device that uses only one type of signal conditioning either logic gates 330_0 to 330_7 and 340_0 to 340_7, or logic gates 350_0 to 350_7 and 360_0 to 360_7 can be eliminated along with multiplexer 370 and the polarity control signal. This configuration still allows selecting any sub-unit of any message unit in the message, but the state of the selected sub-unit is fixed.

The logic can be simplified further if the sub-unit of interest is always the same sub-unit in the same message unit, e.g., bit seven of the last message byte. In this case, the logic always forces bit seven of the last message byte to a selected value as bit seven leaves the expander. Therefore, the embodiments described herein are illustrative only and are not intended to the limit the invention to the specific embodiments described.

For example, the message manipulation circuit can be expanded to change multiple bits within a byte, multiple bytes, or even multiple messages. In one embodiment of message unit detector 270, comparator 315 represents a plurality of comparators, line 271 represents a plurality of lines with one output line from each comparator in the plurality, and register 314 represents a plurality of registers. Similarly, register 321 represents a plurality of registers. In this embodiment, each line in the plurality of lines 271 also goes to encoder 320 to select the sub-unit number in the corresponding one of the registers in the plurality of registers 321. This configuration permits modifying multiple message units on-the-fly, modifying multiple sub-units in a message unit on-the-fly, or a combination of the two.

If modifying multiple messages on-the-fly is of interest, message decoder 301 represents a plurality of message decoders with each message decoder providing an enable signal to message unit detector 270. The enable signal to message unit detector 270 is used to select different message units from plurality of registers 314, or alternatively, to select a set of registers if multiple units in the message are to be changed. In view of FIG. 3, modifications can be made by those of skill in the art to handle less complicated, or more complicated message manipulation. However, in each instance, the content of the message is detected on-the-fly, and modified on-the-fly.

I claim:

1. A device comprising:
   a first I/O bus-interface circuit; and
   an on-the-fly message manipulation circuit connected to said first I/O bus-interface circuit, wherein said on-the-fly message manipulation circuit sets on-the-fly a pre-selected sub-unit of a pre-selected message-unit of a message to a pre-selected state as said pre-selected message-unit is passed through said device, wherein said message is a SCSI Parallel Protocol Request Message.

2. The device of claim 1 wherein on-the-fly manipulation circuit further comprises:
   a message detector module comprising:
      an input coupled to said first I/O bus-interface circuit; and
      a message-detected line, wherein in response to information indicative of said message on said input, said message detector module generates an active signal on said message-detected line.

3. The device of claim 2 wherein said on-the-fly message manipulation circuit further comprises:
   a message-unit detector module having a message-unit detected line, wherein said message-unit detector module generates an active signal on said message-unit detected line upon detecting said pre-selected message-unit of said message.

4. The device of claim 3 wherein said on-the-fly message manipulation circuit further comprises:
   a message sub-unit state selection module coupled to said message-detected line and to said message-unit detected line, wherein said message sub-unit state selection module sets said pre-selected sub-unit of said pre-selected message-unit of said message to said pre-selected state after receiving said active signal on said message-detected line, and said active signal on said message-unit detected line.

5. The device of claim 1 wherein said on-the-fly message manipulation circuit further comprises:
   a message-unit detector module having a message-unit detected line, wherein said message-unit detector module generates an active signal on said message-unit detected line upon detecting said pre-selected message-unit of said message.

6. The device of claim 1 wherein said pre-selected message-unit has a size of one byte.

7. The device of claim 6 wherein said pre-selected sub-unit is a precompensation enable control bit.

8. The device of claim 1 further comprising:
   a second I/O bus-interface circuit connected to said on-the-fly message manipulation circuit.

9. A device comprising:
   a first I/O bus-interface circuit; and
   an on-the-fly message manipulation circuit connected to said first I/O bus-interface circuit, wherein said on-the-fly message manipulation circuit sets on-the-fly a pre-selected sub-unit of a pre-selected message-unit of a message to a pre-selected state as said pre-selected message-unit is passed through said device, wherein said device is a SCSI expander that does not support adjustable active filtering.

10. A device comprising:
    a first I/O bus-interface circuit; and
    an on-the-fly message manipulation circuit connected to said first I/O bus-interface circuit, wherein said on-the-fly message manipulation circuit sets on-the-fly a pre-selected sub-unit of a pre-selected message-unit of a message to a pre-selected state as said pre-selected message-unit is passed through said device, wherein said device is a SCSI expander that supports adjustable active filtering.

11. A SCSI expander comprising:
    a SCSI message manipulation circuit comprising:
       a message-detected line;
       a message-unit detected line; and
       a message sub-unit state selection module connected to said message-detected line and to said message-unit detected line, wherein said message sub-unit state selection module sets a pre-selected sub-unit of a pre-selected message-unit of a SCSI message to a pre-selected state after receiving an active signal on said message-detected line, and an active signal on said message-unit detected line.

12. The SCSI expander of claim 11 wherein said SCSI message manipulation circuit further comprises:
    a message detector module comprising said message-detected line wherein in response to information indicative of said SCSI message, said message detector module generates said active signal on said message-detected line.

13. The SCSI expander of claim 12 wherein said SCSI message manipulation circuit further comprises:
    a message-unit detector module having said message-unit detected line wherein said message-unit detector module generates said active signal on said message-unit detected line upon detecting said pre-selected message-unit of said SCSI message.

14. The SCSI expander of claim 11 wherein said SCSI message manipulation circuit further comprises:
    a message-unit detector module having said message-unit detected line wherein said message-unit detector module generates said active signal on said message-unit detected line upon detecting said pre-selected message-unit of said SCSI message.

15. The SCSI expander of claim 11 wherein said SCSI message is a SCSI Parallel Protocol Request Message.

16. The SCSI expander of claim 15 wherein said pre-selected message-unit has a size of one byte.

17. The SCSI expander of claim 16 wherein said pre-selected sub-unit is a precompensation enable control bit.

18. The SCSI expander of claim 11 wherein said SCSI expander is a SCSI expander that supports adjustable active filtering.

19. The SCSI expander of claim 11 wherein said SCSI expander supports adjustable active filtering.

20. A SCSI expander comprising:
    a SCSI message manipulation circuit comprising:
       a message detector module comprising:
          a message decoder coupled to receive information indicative of a SCSI message from a SCSI bus; and
          a message-detected line connected to said message decoder wherein said message decoder generates an active signal on said message-detected line upon decoding said information indicative of said SCSI message;
       a message-unit detector module comprising:
          a counter wherein said counter counts message-units in said SCSI message;
          a message-unit selection register;
          a comparator connected to said counter and to said message-unit selection register; and
          a message-unit detected line connected to said comparator, wherein said comparator generates an active signal on said message-unit detected line upon receiving a value from said counter that has a pre-selected relationship to a value stored in said message-unit selection register to indicate that a pre-selected message unit has been detected; and a message sub-unit state selection module connected to said message-detected line and to said message-unit detected line wherein said message sub-unit state selection module sets a pre-selected sub-unit of said pre-selected message-unit of said SCSI message to a pre-selected state upon receiving said active signal on said message-detected line, and said active signal on said message-unit detected line, as said pre-selected message-unit passes through said SCSI expander.

21. The SCSI expander of claim 20 wherein said message sub-unit state selection module further comprises:
an encoder connected to an enable sub-unit bus.

22. The SCSI expander of claim 21 wherein said message sub-unit state selection module further comprises:
a sub-unit selection register connected to said encoder.

23. The SCSI expander of claim 20 wherein said message sub-unit state selection module further comprises:
an output bus having a plurality of output lines.

24. The SCSI expander of claim 23 wherein said message sub-unit state selection module further comprises:
a first plurality of logic gates wherein an output terminal of each logic gate of said first plurality of logic gates is selectively coupled to and selectively decoupled from a different output line of said output bus.

25. The SCSI expander of claim 24 wherein said message sub-unit state selection module further comprises:
an input bus having a plurality of input lines wherein each line in said plurality of input lines is connected to a first input terminal of a different logic gate in said first plurality of logic gates.

26. The SCSI expander of claim 25 wherein said message sub-unit state selection module further comprises:

a second plurality of logic gates wherein an output terminal of each logic gate of said second plurality of logic gates is connected to a second input terminal of said different logic gate in said first plurality of logic gates.

27. The SCSI expander of claim 26 wherein said message-detected line is connected to a first input terminal of each logic gate of said second plurality of logic gates.

28. The SCSI expander of claim 27 wherein said message-unit detected line is connected to a second input terminal of each logic gate of said second plurality of logic gates.

29. The SCSI expander of claim 28 wherein said message sub-unit state selection module further comprises:
an encoder having an enable sub-unit output bus-including a plurality of lines wherein each line in said enable sub-unit output bus is connected to a third input terminal of a different logic gate in said second plurality of logic gates.

30. The SCSI expander of claim 29 wherein said message sub-unit state selection module further comprises:
a sub-unit selection register connected to said encoder.

31. A method for configuring a pre-selected sub-unit of a message on-the-fly comprising:
detecting said message using a hardware circuit;
detecting a pre-selected message-unit of said message using said hardware circuit; and
configuring said pre-selected sub-unit of said pre-selected message-unit of said message to a pre-selected state using said hardware circuit as said pre-selected message-unit is passed through a device including said hardware circuit wherein said message is a SCSI Parallel Protocol Request message.

32. The method claim 31 wherein said sub-unit is a bit in said SCSI Parallel Protocol Request message specifying signal conditioning supported by said expander.

* * * * *